United States Patent
Vishwakarma et al.

(10) Patent No.: US 11,455,577 B2
(45) Date of Patent: Sep. 27, 2022

(54) AUTOMATICALLY ALLOCATING DEVICE RESOURCES USING MACHINE LEARNING TECHNIQUES

(71) Applicant: EMC IP Holding Company LLC, Hopkinton, MA (US)

(72) Inventors: Rahul Vishwakarma, Bangalore (IN); Hemant Gaikwad, Bangalore (IN); Gopal Singh, Lucknow (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 433 days.

(21) Appl. No.: 16/778,508

(22) Filed: Jan. 31, 2020

(65) Prior Publication Data

US 2021/0241180 A1   Aug. 5, 2021

(51) Int. Cl.
*G06F 11/00* (2006.01)
*G06N 20/20* (2019.01)
(Continued)

(52) U.S. Cl.
CPC ........... *G06N 20/20* (2019.01); *G06F 3/0617* (2013.01); *G06F 3/0619* (2013.01); *G06F 3/0629* (2013.01); *G06F 3/0689* (2013.01); *G06F 11/008* (2013.01); *G06F 11/2028* (2013.01); *G06K 9/6257* (2013.01)

(58) Field of Classification Search
CPC ............. G06F 11/2028; G06F 11/2053; G06F 11/2094
See application file for complete search history.

(56) References Cited

U.S. PATENT DOCUMENTS 10,257,116 B1   4/2019   Vadera et al.
10,452,441 B1   10/2019  Mobeen
(Continued)

OTHER PUBLICATIONS

Mahdisoltani et al., University of Toronto; Ioan Stefanovici, Microsoft Research; Bianca Schroeder, University of Toronto. 2017. Proactive error prediction to improve storage system reliability. 2017 USENIX Annual Technical Conference (USENIX ATC '17).
(Continued)

*Primary Examiner* — Philip Guyton
(74) *Attorney, Agent, or Firm* — Ryan, Mason & Lewis, LLP (57) ABSTRACT

Methods, apparatus, and processor-readable storage media for automatically allocating device resources using machine learning techniques are provided herein. An example computer-implemented method includes determining values for multiple parameters from data obtained from one or more devices; generating at least one device component failure prediction by applying one or more machine learning techniques to at least a portion of the determined values; computing one or more qualifying values attributable to the at least one generated device component failure prediction by providing the at least one generated device component failure prediction to a conformal prediction framework; and automatically allocating one or more resources to at least a portion of the one or more devices based at least in part on the at least one generated device component failure prediction and the one or more computed qualifying values.

20 Claims, 6 Drawing Sheets

(51) Int. Cl.
*G06K 9/62* (2022.01)
*G06F 3/06* (2006.01)
*G06F 11/20* (2006.01)

(56) References Cited

U.S. PATENT DOCUMENTS

2018/0365093 A1* 12/2018 Musuvathi .......... G06F 11/3447
2021/0200616 A1* 7/2021 Xu ........................ G06F 3/0617
2021/0241180 A1* 8/2021 Vishwakarma ........ G06N 5/003

OTHER PUBLICATIONS

Gaber et al., 2017. Predicting HDD failures from compound SMART attributes. In Proceedings of the 10th ACM International Systems and Storage Conference (SYSTOR '17) ACM, New York, NY, USA, Article 31, 1.

* cited by examiner

AUTOMATICALLY ALLOCATING DEVICE RESOURCES USING MACHINE LEARNING TECHNIQUES

FIELD

The field relates generally to information processing systems, and more particularly to techniques for managing resource allocation using such systems.

BACKGROUND

Device component failure presents problems across many industries. For example, disk drive failure can cause data unavailability as well as permanent data loss. However, conventional device component failure detection techniques provide only a binary output (i.e., normal versus likely to fail). Additionally, using such conventional techniques, enterprises commonly make decisions to replace device components that are likely to fail independent of temporal contextual information, leading to increased costs associated with premature replacements.

SUMMARY

Illustrative embodiments of the disclosure provide techniques for automatically allocating device resources using machine learning techniques. An exemplary computer-implemented method includes determining values for multiple parameters from data obtained from one or more devices, and generating at least one device component failure prediction by applying one or more machine learning techniques to at least a portion of the determined values. The method also includes computing one or more qualifying values attributable to the at least one generated device component failure prediction by providing the at least one generated device component failure prediction to a conformal prediction framework. Further, the method additionally includes automatically allocating one or more resources to at least a portion of the one or more devices based at least in part on the at least one generated device component failure prediction and the one or more computed qualifying values.

Illustrative embodiments can provide significant advantages relative to conventional device component failure detection techniques. For example, increased costs associated with premature device component replacements are avoided in one or more embodiments through using machine learning techniques in conjunction with a conformal framework to generate device component failure predictions.

These and other illustrative embodiments described herein include, without limitation, methods, apparatus, systems, and computer program products comprising processor-readable storage media.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
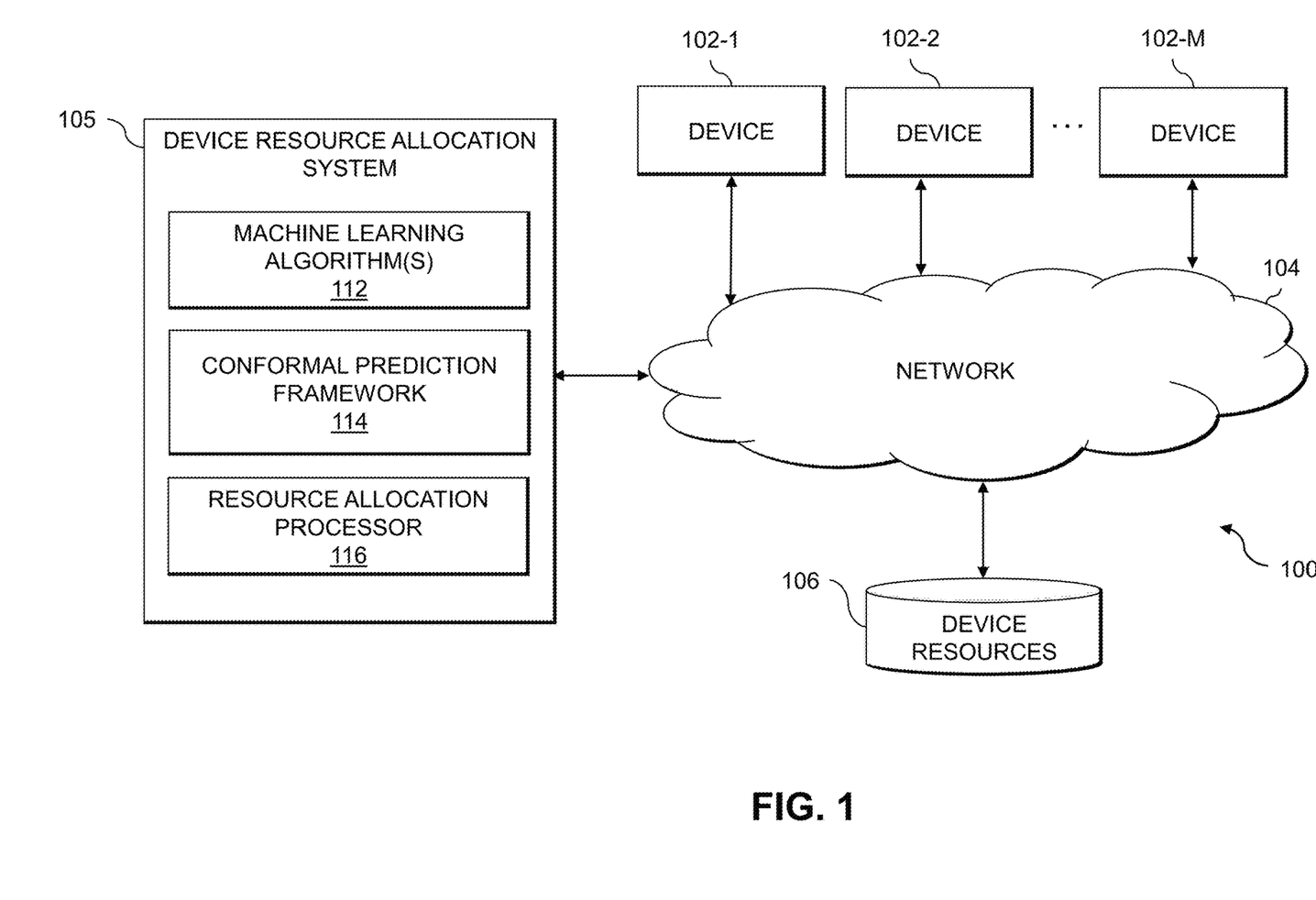
FIG. 1 shows an information processing system configured for automatically allocating device resources using machine learning techniques in an illustrative embodiment.

FIG. 1 shows a computer network (also referred to herein as an information processing system) 100 configured in accordance with an illustrative embodiment. The computer network 100 comprises a plurality of devices 102-1, 102-2, . . . 102-M, collectively referred to herein as devices 102. The devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is device resource allocation system 105. The devices 102 may comprise, for example, storage devices, Internet of Things devices, mobile telephones, laptop computers, tablet computers, desktop computers or other types of computing devices. Such devices are examples of what are more generally referred to herein as "processing devices." Some of these processing devices are also generally referred to herein as "computers."

The devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, the device resource allocation system 105 can have an associated device resources database 106 configured to store data pertaining to device component data, device component lifecycle information, device-related predictions, etc.

The device resources database 106 in the present embodiment is implemented using one or more storage systems associated with device resource allocation system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the device resource allocation system 105 can be input-output devices, which illustratively comprise keyboards, displays or other types of input-output devices in any combination. Such input-output devices can be used, for example, to support one or more user interfaces to device resource allocation system 105, as well as to support communication between the device resource allocation system 105 and other related systems and devices not explicitly shown.

The device resource allocation system 105 in the FIG. 1 embodiment is assumed to be implemented using at least one processing device. Each such processing device generally comprises at least one processor and an associated memory, and implements one or more functional modules for controlling certain features of the device resource allocation system 105.

More particularly, the device resource allocation system 105 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals.

The network interface allows the device resource allocation system 105 to communicate over the network 104 with the devices 102, and illustratively comprises one or more conventional transceivers.

The device resource allocation system 105 further comprises machine learning algorithm(s) 112, a conformal prediction framework 114, and a resource allocation processor 116.

It is to be appreciated that this particular arrangement of modules 112, 114, and 116 illustrated in the device resource allocation system 105 of the FIG. 1 embodiment is presented by way of example only, and alternative arrangements can be used in other embodiments. For example, the functionality associated with the modules 112, 114, and 116 in other embodiments can be combined into a single module, or separated across a larger number of modules. As another example, multiple distinct processors can be used to implement different ones of the modules 112, 114, and 116 or portions thereof.

At least portions of modules 112, 114, and 116 may be implemented at least in part in the form of software that is stored in memory and executed by a processor.

It is to be understood that the particular set of elements shown in FIG. 1 for automatically allocating device resources using machine learning techniques involving devices 102 of computer network 100 is presented by way of illustrative example only, and in other embodiments additional or alternative elements may be used. Thus, another embodiment includes additional or alternative systems, devices and other network entities, as well as different arrangements of modules and other components.

An exemplary process utilizing modules 112, 114, and 116 of an example device resource allocation system 105 in computer network 100 will be described in more detail with reference to the flow diagram of FIG. 4.

Accordingly, at least one embodiment includes dynamic hot sparing based at least in part on ranking failed disk drives in a storage infrastructure. These and other references to "disks" herein are intended to refer generally to storage devices, including solid state drives (SSDs), and should therefore not be viewed as limited in any way to spinning magnetic media.

As further detailed herein, one or more embodiments includes determining a number of failing disks, as well as the severity of each of the failing disks. Such an embodiment then includes prioritizing the order in which the failing disks are to be addressed. Additionally, at least one embodiment includes adding a spare disk to the existing redundant array of independent disks (RAID) group, wherein spare disk assignment is based at least in part on a prediction confidence-based ranking. In such an embodiment, adding the spare disk to the existing redundant array may be performed without removing the disk(s) which is/are going to fail.

Figure 2:
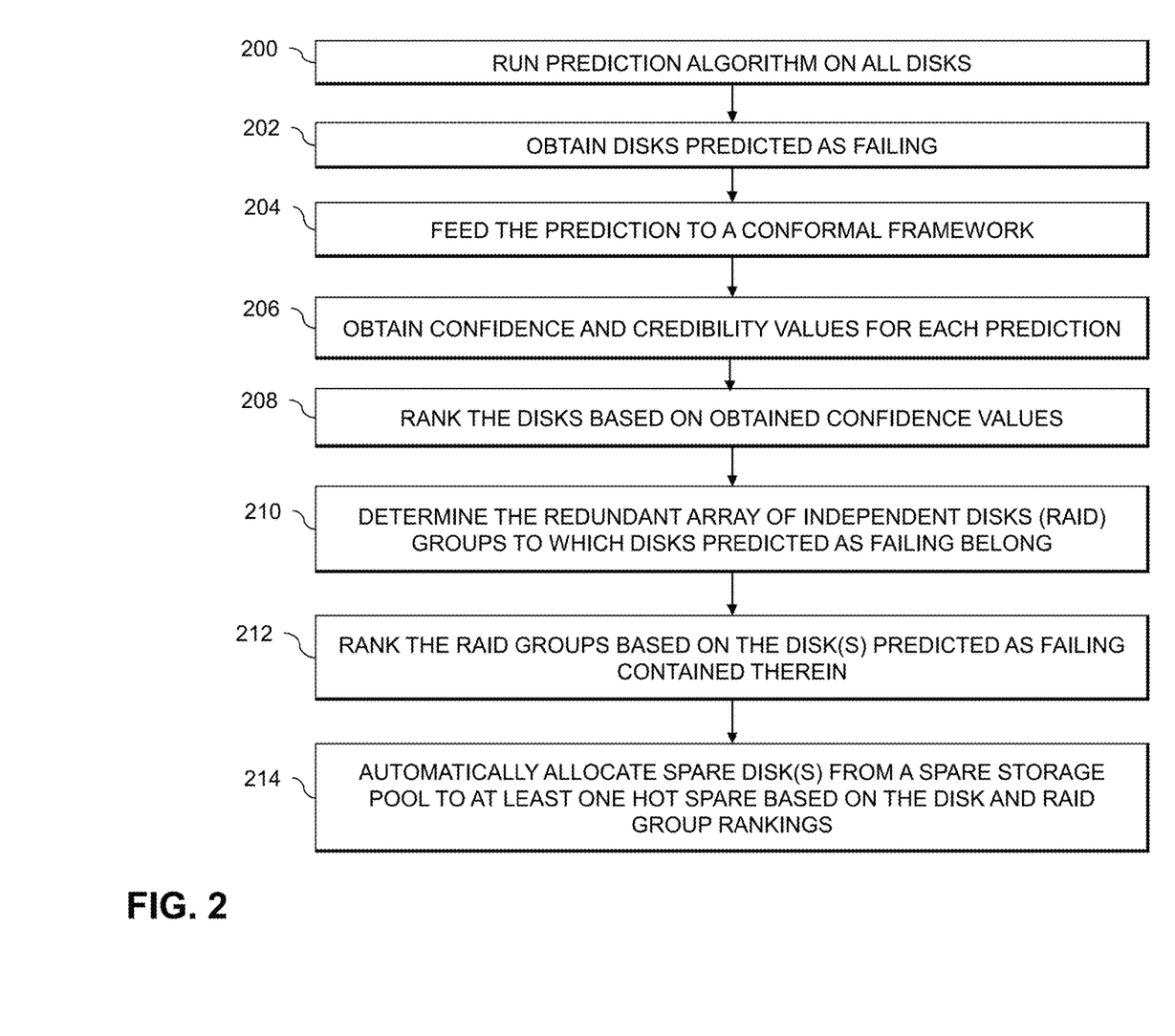
FIG. 2 shows a workflow for automatically allocating device resources using machine learning techniques in an illustrative embodiment.

FIG. 2 shows a workflow for automatically allocating device resources using machine learning techniques in an illustrative embodiment. Step 200 includes running a prediction algorithm on all disks, and step 202 includes obtaining and/or identifying the disks that are predicted as failing. Step 204 includes feeding the prediction(s) to a conformal framework, while step 206 includes determining and/or obtaining confidence and credibility values for each prediction. Step 208 includes ranking the disks (i.e., the disks predicted as failing) based at least in part on the confidence values, and step 210 includes determining the RAID groups to which the disks predicted as failing belong. Step 212 includes ranking the RAID groups based at least in part on the disk(s) predicted as failing contained therein, and step 214 includes automatically allocating spare disk(s) from a spare storage pool to at least one hot spare based at least in part on the disk and RAID group rankings.

As detailed herein, one or more embodiments includes determining values for multiple parameters from data obtained from one or more devices (e.g., storage devices). In such an embodiment, the obtained data can be processed, for example, to remedy missing data values by substituting median values. At least one embodiment also includes selecting the multiple parameters, wherein such an embodiment can include using a hybrid approach for selecting the parameters that includes self-monitoring, analysis and reporting technology (SMART) and small computer system interface (SCSI) return error value(s). Additionally or alternatively, one or more embodiments includes applying one or more gradient boosting machine learning techniques, one or more extra tree classifiers, one or more decision trees, and/or one or more random forest techniques to the dataset. By way merely of example, such parameters and/or variables utilized for analysis in a storage device context can include, disk temperature, disk capacity, range information, start and stop count, etc.

Also, at least one embodiment includes implementing an incremental stochastic gradient descent (SGD) binary classifier. Such an incremental and/or online algorithm continuously incorporates new information into the model, which makes such a classifier viable for concept drift and involves less time complexity than other classifiers. Accordingly, at least one embodiment includes using at least one incremental SGD classifier on different batch sizes, wherein the optimal number of the batch size can be user-determined based, for example, on hyper-parameter optimization. With respect to the incremental SGD classifier, assume an example use case wherein X is a matrix of size (n, p), training has a cost of O (knp̂), wherein k is the number of iterations (epochs), and p̂ is the average number of non-zero attributes per sample.

As also noted herein, one or more embodiments includes implementing a conformal prediction (CP) framework in conjunction with an online SGD binary classifier. In such an embodiment, the CP framework complements the predictions of the machine learning algorithm(s) with measures of confidence and/or credibility. By way of example, at least one embodiment includes utilizing an inductive conformal prediction (ICP) framework with incremental SGD as the underlying machine learning algorithm.

A CP framework outputs multi-value prediction regions. By way of illustration, given a test pattern $X_i$ and a significance level $\epsilon$, a conformal predictor outputs a prediction region $$\Gamma_i^{\frac{\epsilon}{}}$$

that contains $y_j$ with probability 1-$\epsilon$. Such multi-value prediction regions can include confidence values and credibility values. As used herein, such confidence values refer to measures indicative of the quality of the generated prediction. Also, as used herein, credibility values refer to measures indicative of the quality of the data on which the generated prediction was based. In one or more embodiments, confidence and/or credibility values can be utilized as a filter mechanism with which predictions can be ranked.

Figure 3:
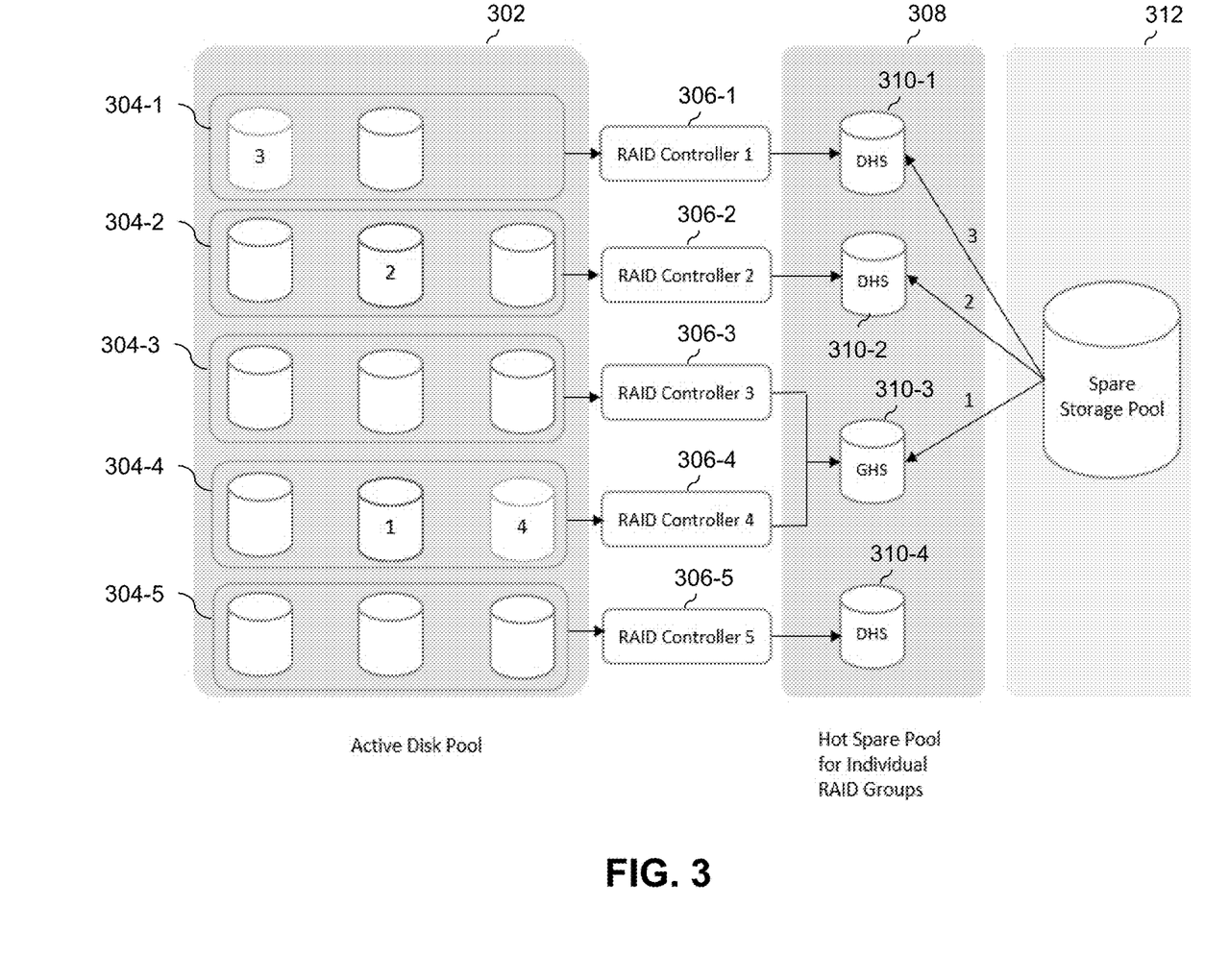
FIG. 3 shows ranking-based spare disk allocation in an illustrative embodiment.

FIG. 3 shows ranking-based spare disk allocation in an illustrative embodiment. By way of illustration, FIG. 3 depicts active disk pool 302, which includes RAID groups 304-1, 304-2, 304-3, 304-4, and 304-5 (each containing two or more disks). FIG. 3 also depicts RAID controllers 306-1, 306-2, 306-3, 306-4, and 306-5, which connect the RAID groups to hot spare pool 308, which includes dedicated hot spare (DHS) 310-1, 310-2, and 310-4, as well as global hot spare (GHS) 310-3. As used herein, DHS and GHS represent the in-place sparing mechanism for the RAID groups. Further, FIG. 3 also depicts a spare storage pool 312.

Accordingly, upon generating a prediction that two or more disks are going to fail, one or more embodiments can include ranking the disks predicted for failure (denoted in FIG. 3 via the disks labeled with numbers 1, 2, 3, and 4) according to their confidence measures (that is, confidence in the prediction of failure). In conjunction with ranking each of the failing disks, at least one embodiment includes ranking the RAID groups (denoted in FIG. 3 by the arrows labeled with numbers 1, 2, and 3) based on the failing disks that the RAID groups encounter. Subsequently, one or more disks are allotted from the spare storage pool 312 to individual RAID groups via corresponding hot spare pools based on the rankings.

As is to be appreciated, one or more embodiments can be implemented with various use cases in addition to storage devices. Such additional use cases can include, for example, binary classification of device components such as central processing units, batteries, networks, etc. In such an embodiment, a dataset for each component is obtained and/or created, and fed to the forecasting model(s) detailed herein.

Figure 4:
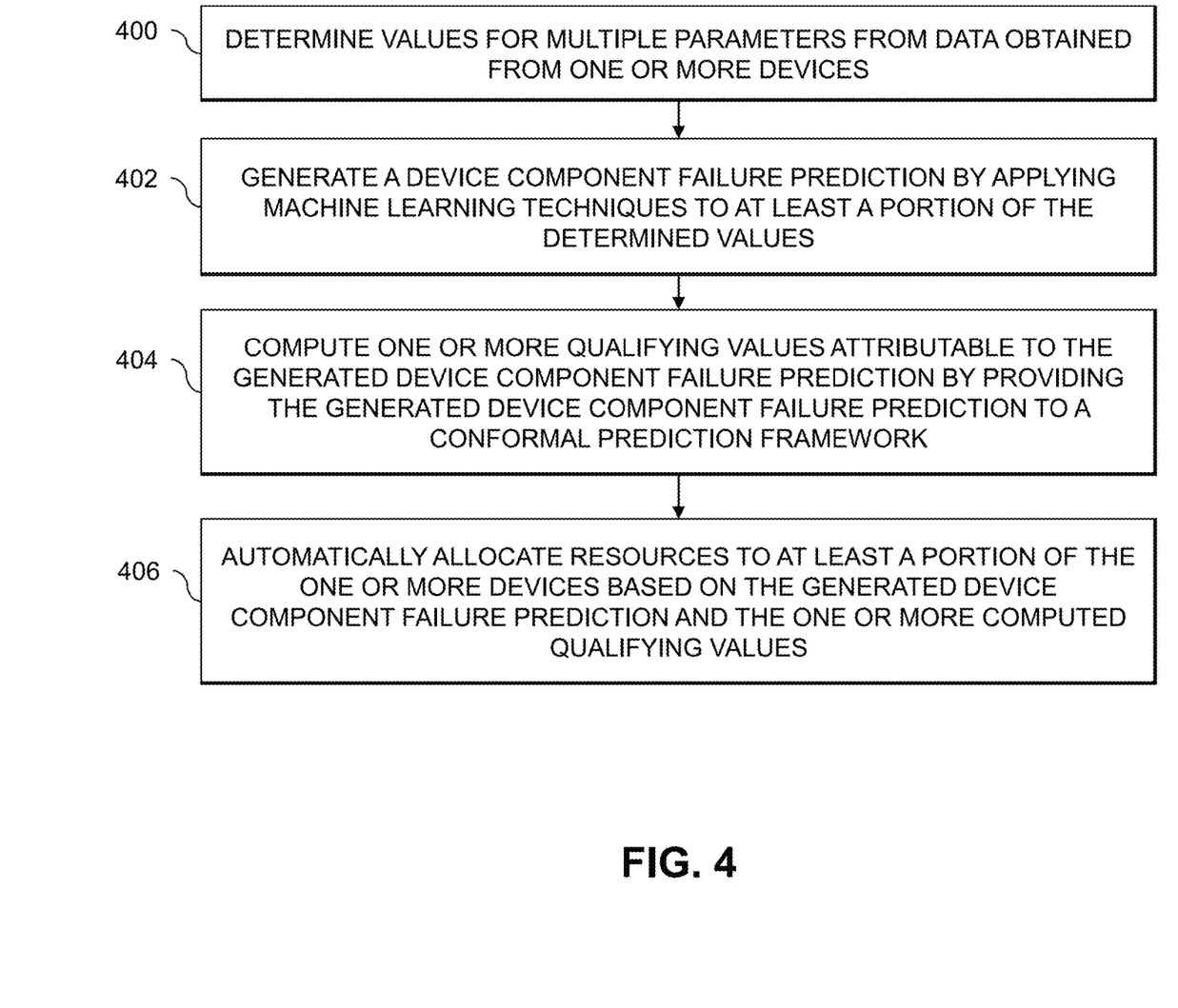
FIG. 4 is a flow diagram of a process for automatically allocating device resources using machine learning techniques in an illustrative embodiment.

FIG. 4 is a flow diagram of a process for automatically allocating device resources using machine learning techniques in an illustrative embodiment. It is to be understood that this particular process is only an example, and additional or alternative processes can be carried out in other embodiments.

In this embodiment, the process includes steps 400 through 406. These steps are assumed to be performed by the device resource allocation system utilizing its modules 112, 114, and 116.

Step 400 includes determining values for multiple parameters from data obtained from one or more devices. One or more embodiments include identifying the multiple parameters from a set of parameters by applying multiple machine learning techniques to a dataset related to device component failure. In such an embodiment, the multiple machine learning techniques include at least two of: one or more gradient boosting algorithms, one or more extra trees algorithms, one or more random forest algorithms, one or more decision tree algorithms, and one or more adaptive boosting algorithms.

Step 402 includes generating at least one device component failure prediction by applying one or more machine learning techniques to at least a portion of the determined values. In at least one embodiment, the one or more machine learning techniques can include at least one SGD classification algorithm and/or at least one SGD classification algorithm integrated with at least one isotonic regression algorithm.

Step 404 includes computing one or more qualifying values attributable to the at least one generated device component failure prediction by providing the at least one generated device component failure prediction to a CP framework. In at least one embodiment, the CP framework includes an ICP framework. Also, the one or more qualifying values can include at least one confidence value attributed to the at least one generated device component failure prediction and/or at least one credibility value indicating quality of the data obtained from the one or more devices used in generating the at least one generated device component failure prediction.

Step 406 includes automatically allocating one or more resources to at least a portion of the one or more devices based at least in part on the at least one generated device component failure prediction and the one or more computed qualifying values.

The techniques depicted in FIG. 4 can also include ranking each device component identified in the at least one generated device component failure prediction based at least in part on the one or more computed qualifying values, as well as ranking a set of resources based at least in part on a level of interaction between each resource in the set of resources and each device component identified in the at least one generated device component failure prediction. Further, in such an embodiment, automatically allocating the one or more resources includes automatically allocating one or more resources from the set of resources based at least in part on the ranking of each device component identified in the at least one generated device component failure prediction and the ranking of the set of resources.

Also, in at least one embodiment, the one or more devices include multiple storage devices, the one or more resources include one or more spare disks, and a method in accordance with the techniques depicted in FIG. 4 can include the following. Predictions pertaining to which of the multiple storage devices are going to fail are generated by applying the one or more machine learning techniques to at least a portion of the determined values. Confidence values attributable to the storage devices predicted to fail are computed by providing the predictions to the CP framework, and the storage devices predicted to fail are ranked based at least in part on the computed confidence values. Also, one or more redundant array of independent disk groups to which the disks predicted to fail belong are determined and/or identified, and the one or more redundant array of independent disk groups are ranked based at least in part on the disks predicted to fail contained therein. Further, one or more spare disks are automatically allocated from a spare storage pool to at least one hot spare associated with the storage devices predicted to fail based at least in part on the ranking of the storage devices predicted to fail and the ranking of the one or more redundant array of independent disk groups.

Accordingly, the particular processing operations and other functionality described in conjunction with the flow diagram of FIG. 4 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to implement machine learning techniques in conjunction with a conformal framework to generate device component failure predictions. These and other embodiments can effectively avoid costs associated with premature device component replacements.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 5 and 6. Although described in the context of system 100, these platforms may also be used to implement at least portions of other information processing systems in other embodiments.

Figure 5:
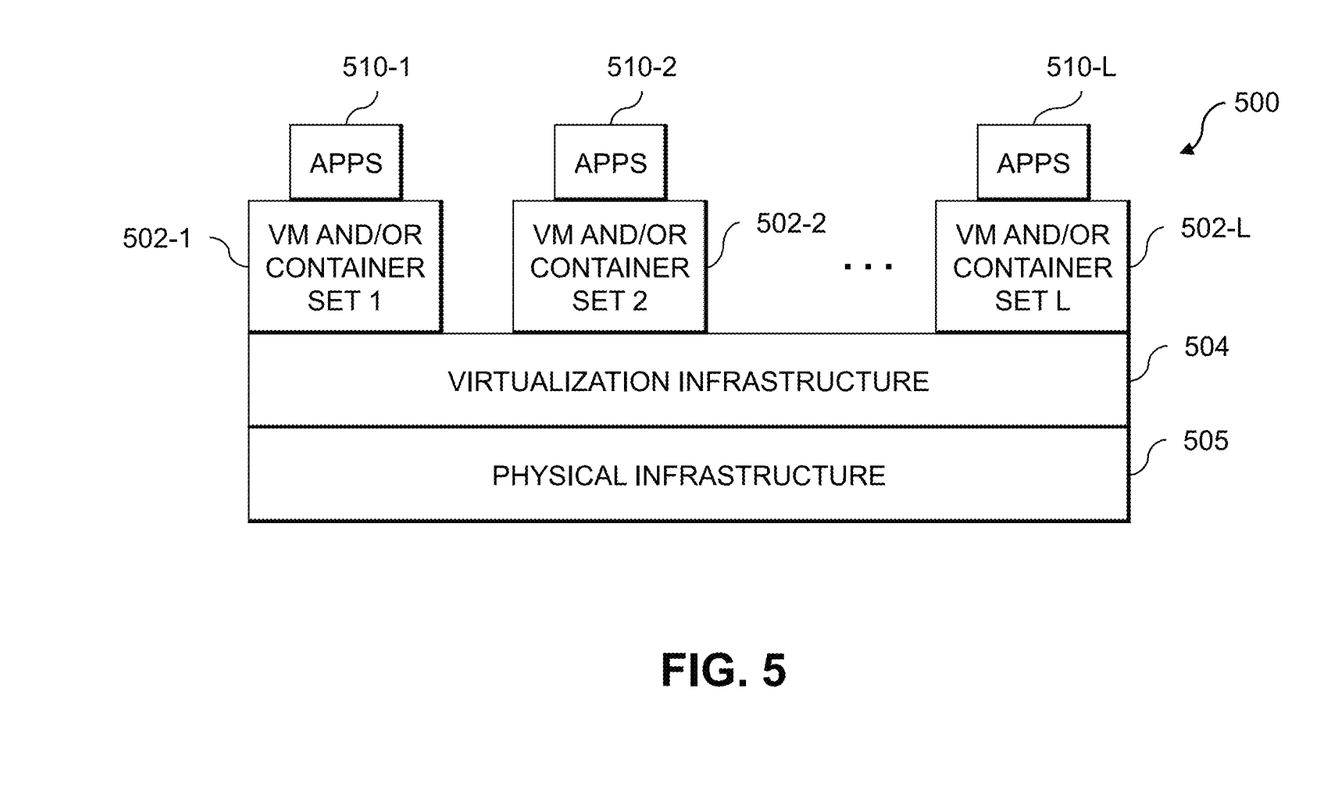
FIGS. 5 and 6 show examples of processing platforms that may be utilized to implement at least a portion of an information processing system in illustrative embodiments.
Figure 6:
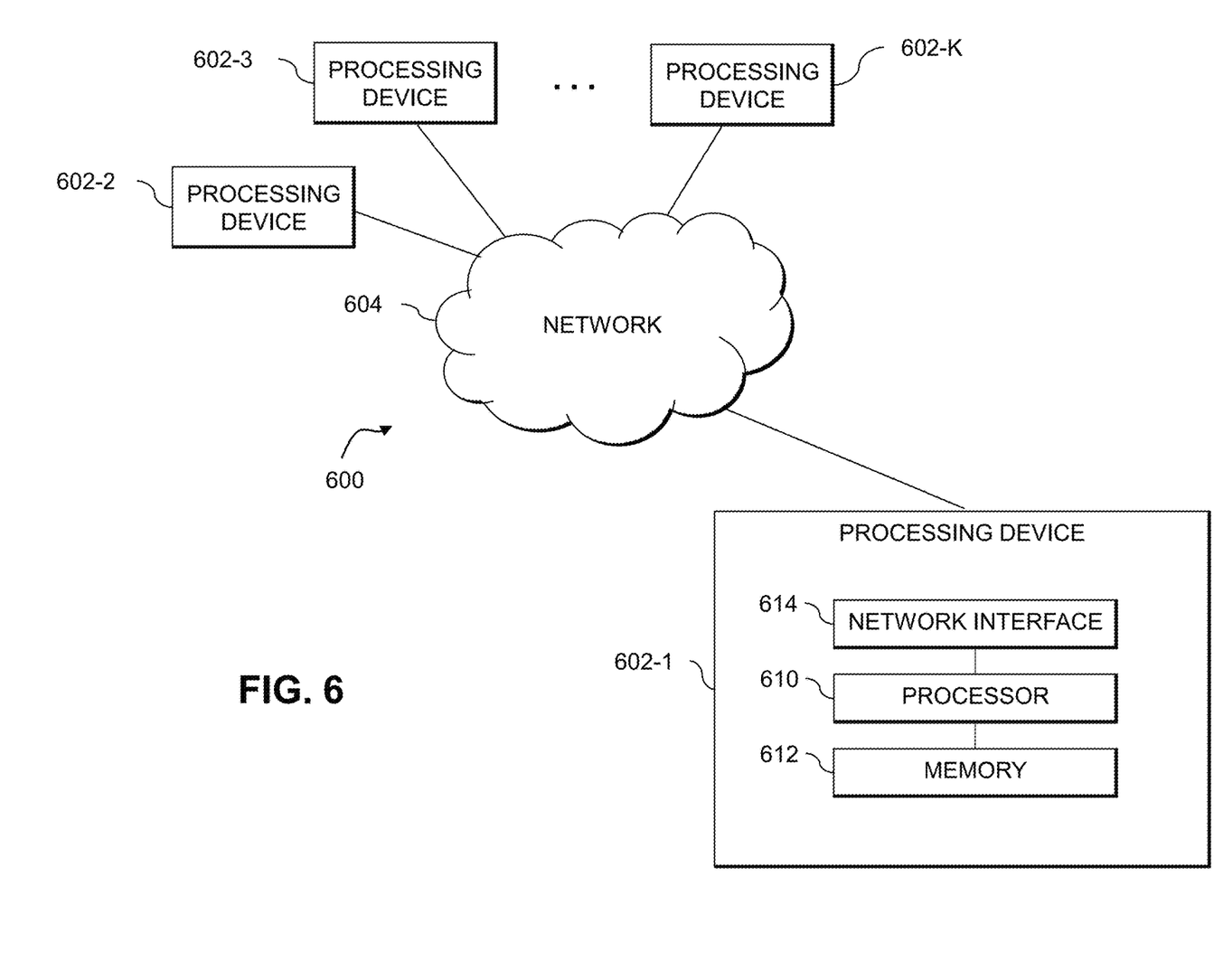

FIG. 5 shows an example processing platform comprising cloud infrastructure 500. The cloud infrastructure 500 comprises a combination of physical and virtual processing resources that are utilized to implement at least a portion of the information processing system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 comprise respective VMs, respective sets of one or more containers, or respective sets of one or more containers running in VMs. In some implementations of the FIG. 5 embodiment, the VMs/container sets 502 comprise respective VMs implemented using virtualization infrastructure 504 that comprises at least one hypervisor.

A hypervisor platform may be used to implement a hypervisor within the virtualization infrastructure 504, wherein the hypervisor platform has an associated virtual infrastructure management system. The underlying physical machines comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, ... 602-K, which communicate with one another over a network 604.

The network 604 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 602-1 in the processing platform 600 comprises a processor 610 coupled to a memory 612.

The processor 610 comprises a microprocessor, a microcontroller, an application-specific integrated circuit (ASIC), a field-programmable gate array (FPGA) or other type of processing circuitry, as well as portions or combinations of such circuitry elements.

The memory 612 comprises random access memory (RAM), read-only memory (ROM) or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
   determining values for multiple parameters from data obtained from one or more devices;
   generating at least one device component failure prediction by applying one or more machine learning techniques to at least a portion of the determined values;
   computing one or more qualifying values attributable to the at least one generated device component failure prediction by providing the at least one generated device component failure prediction to a conformal prediction framework, wherein the conformal prediction framework comprises an inductive conformal prediction framework; and
automatically allocating one or more resources to at least a portion of the one or more devices based at least in part on the at least one generated device component failure prediction and the one or more computed qualifying values;
wherein the method is performed by at least one processing device comprising a processor coupled to a memory.

2. The computer-implemented method of claim 1, further comprising:
ranking each device component identified in the at least one generated device component failure prediction based at least in part on the one or more computed qualifying values.

3. The computer-implemented method of claim 2, further comprising:
ranking a set of resources based at least in part on a level of interaction between each resource in the set of resources and each device component identified in the at least one generated device component failure prediction.

4. The computer-implemented method of claim 3, wherein automatically allocating the one or more resources comprises automatically allocating one or more resources from the set of resources based at least in part on the ranking of each device component identified in the at least one generated device component failure prediction and the ranking of the set of resources.

5. The computer-implemented method of claim 1, wherein the one or more machine learning techniques comprises at least one stochastic gradient descent classification algorithm.

6. The computer-implemented method of claim 1, wherein the one or more machine learning techniques comprises at least one stochastic gradient descent classification algorithm integrated with at least one isotonic regression algorithm.

7. The computer-implemented method of claim 1, further comprising:
identifying the multiple parameters from a set of parameters by applying multiple machine learning techniques to a dataset related to device component failure.

8. The computer-implemented method of claim 7, wherein the multiple machine learning techniques comprise at least two of: one or more gradient boosting algorithms, one or more extra trees algorithms, one or more random forest algorithms, one or more decision tree algorithms, and one or more adaptive boosting algorithms.

9. The computer-implemented method of claim 1, wherein the one or more devices comprise multiple storage devices, wherein the one or more resources comprises one or more spare disks, and wherein the computer-implemented method comprises:
generating predictions pertaining to which of the multiple storage devices are going to fail by applying the one or more machine learning techniques to at least a portion of the determined values;
computing confidence values attributable to the storage devices predicted to fail by providing the predictions to the conformal prediction framework;
ranking the storage devices predicted to fail based at least in part on the computed confidence values;
determining one or more redundant array of independent disk groups to which the disks predicted to fail belong;
ranking the one or more redundant array of independent disk groups based at least in part on the disks predicted to fail contained therein; and
automatically allocating one or more spare disks from a spare storage pool to at least one hot spare associated with the storage devices predicted to fail based at least in part on the ranking of the storage devices predicted to fail and the ranking of the one or more redundant array of independent disk groups.

10. The computer-implemented method of claim 1, wherein the one or more qualifying values comprise at least one confidence value attributed to the at least one generated device component failure prediction.

11. The computer-implemented method of claim 1, wherein the one or more qualifying values comprise at least one credibility value indicating quality of the data obtained from the one or more devices used in generating the at least one generated device component failure prediction.

12. A non-transitory processor-readable storage medium having stored therein program code of one or more software programs, wherein the program code when executed by at least one processing device causes the at least one processing device:
to determine values for multiple parameters from data obtained from one or more devices;
to generate at least one device component failure prediction by applying one or more machine learning techniques to at least a portion of the determined values;
to compute one or more qualifying values attributable to the at least one generated device component failure prediction by providing the at least one generated device component failure prediction to a conformal prediction framework, wherein the conformal prediction framework comprises an inductive conformal prediction framework; and
to automatically allocate one or more resources to at least a portion of the one or more devices based at least in part on the at least one generated device component failure prediction and the one or more computed qualifying values.

13. The non-transitory processor-readable storage medium of claim 12, wherein the program code when executed by the at least one processing device further causes the at least one processing device:
to rank each device component identified in the at least one generated device component failure prediction based at least in part on the one or more computed qualifying values.

14. The non-transitory processor-readable storage medium of claim 13, wherein the program code when executed by the at least one processing device further causes the at least one processing device:
to rank a set of resources based at least in part on a level of interaction between each resource in the set of resources and each device component identified in the at least one generated device component failure prediction.

15. The non-transitory processor-readable storage medium of claim 14, wherein automatically allocating the one or more resources comprises automatically allocating one or more resources from the set of resources based at least in part on the ranking of each device component identified in the at least one generated device component failure prediction and the ranking of the set of resources.

16. An apparatus comprising:
at least one processing device comprising a processor coupled to a memory;
the at least one processing device being configured:
   to determine values for multiple parameters from data obtained from one or more devices;
   to generate at least one device component failure prediction by applying one or more machine learning techniques to at least a portion of the determined values;
   to compute one or more qualifying values attributable to the at least one generated device component failure prediction by providing the at least one generated device component failure prediction to a conformal prediction framework, wherein the conformal prediction framework comprises an inductive conformal prediction framework; and
   to automatically allocate one or more resources to at least a portion of the one or more devices based at least in part on the at least one generated device component failure prediction and the one or more computed qualifying values.

17. The apparatus of claim 16, the at least one processing device being further configured:
   to rank each device component identified in the at least one generated device component failure prediction based at least in part on the one or more computed qualifying values.

18. The apparatus of claim 17, the at least one processing device being further configured:
   to rank a set of resources based at least in part on a level of interaction between each resource in the set of resources and each device component identified in the at least one generated device component failure prediction.

19. The apparatus of claim 18, wherein automatically allocating the one or more resources comprises automatically allocating one or more resources from the set of resources based at least in part on the ranking of each device component identified in the at least one generated device component failure prediction and the ranking of the set of resources.

20. The apparatus of claim 16, wherein the one or more machine learning techniques comprises at least one stochastic gradient descent classification algorithm integrated with at least one isotonic regression algorithm.

\* \* \* \* \*